(12) United States Patent
Smith

(10) Patent No.: US 8,702,360 B1
(45) Date of Patent: Apr. 22, 2014

(54) ADJUSTABLE CARGO TIE DOWN DEVICE

(71) Applicant: Richard H Smith, East Liverpool, OH (US)

(72) Inventor: Richard H Smith, East Liverpool, OH (US)

(*) Notice: Subject to any disclaimer, the term of this patent is extended or adjusted under 35 U.S.C. 154(b) by 0 days.

(21) Appl. No.: 13/716,658

(22) Filed: Dec. 17, 2012

(51) Int. Cl.
*B60P 7/08* (2006.01)

(52) U.S. Cl.
USPC .............................. 410/116; 410/97

(58) Field of Classification Search
USPC ............. 410/10, 11, 12, 23, 96, 97, 100, 116; 403/48; 24/265 CD; 248/499
See application file for complete search history.

(56) References Cited

U.S. PATENT DOCUMENTS 7,575,403 B2 * 8/2009 Hsieh .............................. 410/85
7,931,428 B2 * 4/2011 Stille ................................ 410/7

* cited by examiner

*Primary Examiner* — Stephen Gordon
(74) *Attorney, Agent, or Firm* — Harpman & Harpman

(57) ABSTRACT

An adjustable cargo tie down tensioning device for securing cargo in an aircraft and the like comprises, a spring loaded tie down chain restraint release and an adjustable connector having a surface engagement hook. The hook has an integrated threaded shaft with a spring urged retainment release for axle rotation once engaged assuring tie down device tensioning surface orientation for visual inspection of spring engaged chain restraint release required for load surface safety requirements.

5 Claims, 4 Drawing Sheets

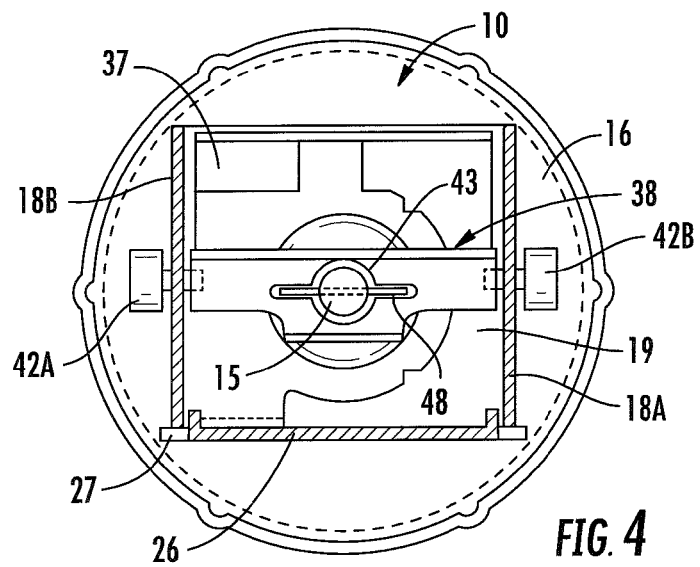
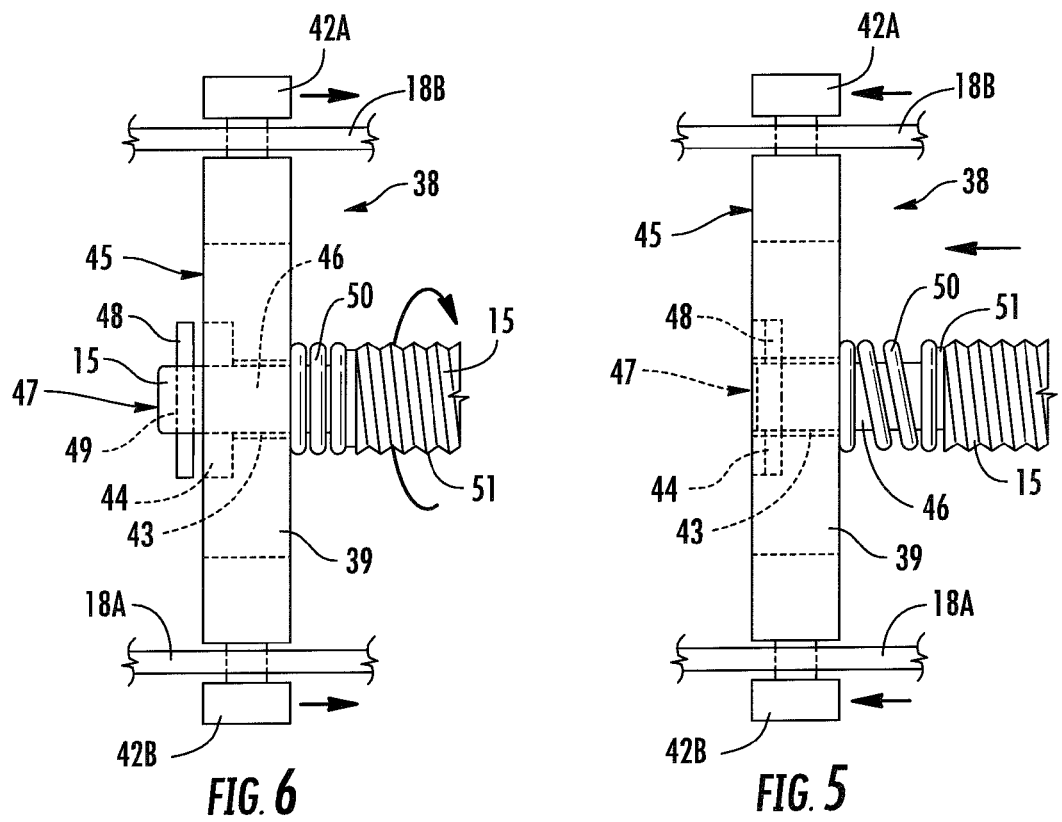
FIG. 4
FIG. 6
FIG. 5

ADJUSTABLE CARGO TIE DOWN DEVICE

BACKGROUND OF THE INVENTION

1. Technical Field

The present invention relates to cargo tie down devices, particularly in aircraft for securing cargo pallets that require quick release adjustment tensioning devices retaining the cargo pallets within the aircraft before release and airborne delivery.

2. Description of Prior Art

Prior art devices of this type are directed to cargo securing and tensioning devices that are used to secure cargo in vehicles including aircraft. Such devices have been specifically developed for these environments with a variety of adjustable features that are required; see for example U.S. Pat. Nos. 7,334,955, 7,249,907, 5,702,196 and 5,159,729.

In U.S. Pat. No. 5,159,729, a tie down device is disclosed for cargo that includes a first and second end with an adjustable turnbuckle assembly so that an engagement strap and hook can be adjusted by rotation longitudinally.

U.S. Pat. No. 5,702,196 claims a turnbuckle type adjustable link wherein the turnbuckle has a threaded engagement first rod and a threaded second rod with an intermediate adjustment sleeve and intermediate resilient springs.

U.S. Pat. No. 7,249,907 illustrates a spring-loaded turnbuckle with a quick disconnect having a spring-loaded rod with an attachment hook. A pivot housing is provided on an opposing upper end with an aperture for locking via a pin or padlock.

U.S. Pat. No. 7,334,955 discloses a turnbuckle assembly for a tension member wherein a pivot handle has a bottom pivot housing allowing for adjustable end and angular pivot orientation thereto.

Other prior art cargo tensioning tie downs have been disclosed including an air cargo device that has an adjustable hook for an aircraft engagement with a spring release load chain retainment release in a fixed orientation to one another.

SUMMARY OF THE INVENTION

An improvement to an air cargo adjustable tensioning tie down device which is used to selectively secure loaded cargo pallets within an aircraft. Specifically, cargo tie down requirements entail the use of quick release tensioning devices wherein secured cargo must be released in flight for air cargo drop by transport aircraft. Such cargo tie downs must be visual inspected to assure proper and safe engagement and therefore the orientation of the cargo tie down for inspection is critical. The adjustable cargo tie down device of the invention allows for the engaged tie down to be axially rotated while engaged under tension to enable ease of visual inspection. A spring urged sliding rod engagement bracket can be disengaged allowing the entire tie down assembly to be rotated 180 degrees for inspection without effecting the cargo tie engagement.

DESCRIPTION OF THE DRAWINGS

FIG. 4 is an enlarged cross-sectional view on lines 4-4 of FIG. 2.

FIG. 5 is an enlarged top plan view of the rotational adjustment broken away in lock engaged non-rotational position.

FIG. 6 is an enlarged top plan view thereof in unlocked rotational position.

DETAILED DESCRIPTION OF THE INVENTION

Figure 1:
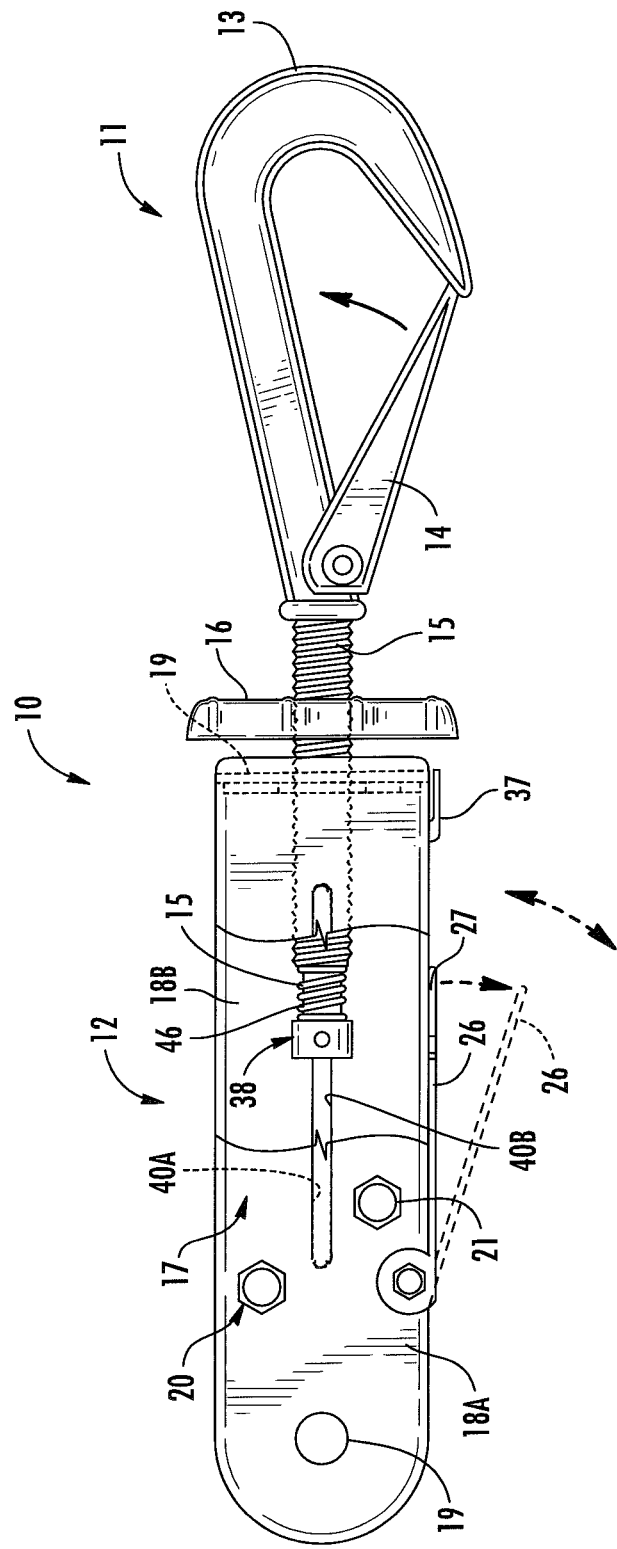
FIG. 1 is a side elevational view of the tie down with a portion cut-away.

An adjustable cargo tensioning device 10 of the invention can be seen in FIG. 1 of the drawings having a hook portion 11 and a release portion 12. The hook portion 11 has a hook member 13 with an integrated spring-urged pivot access arm 14 that selectively pivots open for hook engagement as will be well known by those skilled in the art.

The hook 13 has and is integral with a threaded adjustment rod 15 which extends therefrom to the release portion 12. An annularly adjustment fitting 16 is threadably disposed on the rod 15 between the hook 13 and the release portion 12 which allows for incremental longitudinal rod adjustment effective length and therefore that of the hook 13 as will be described in greater detail hereinafter.

Figure 2:
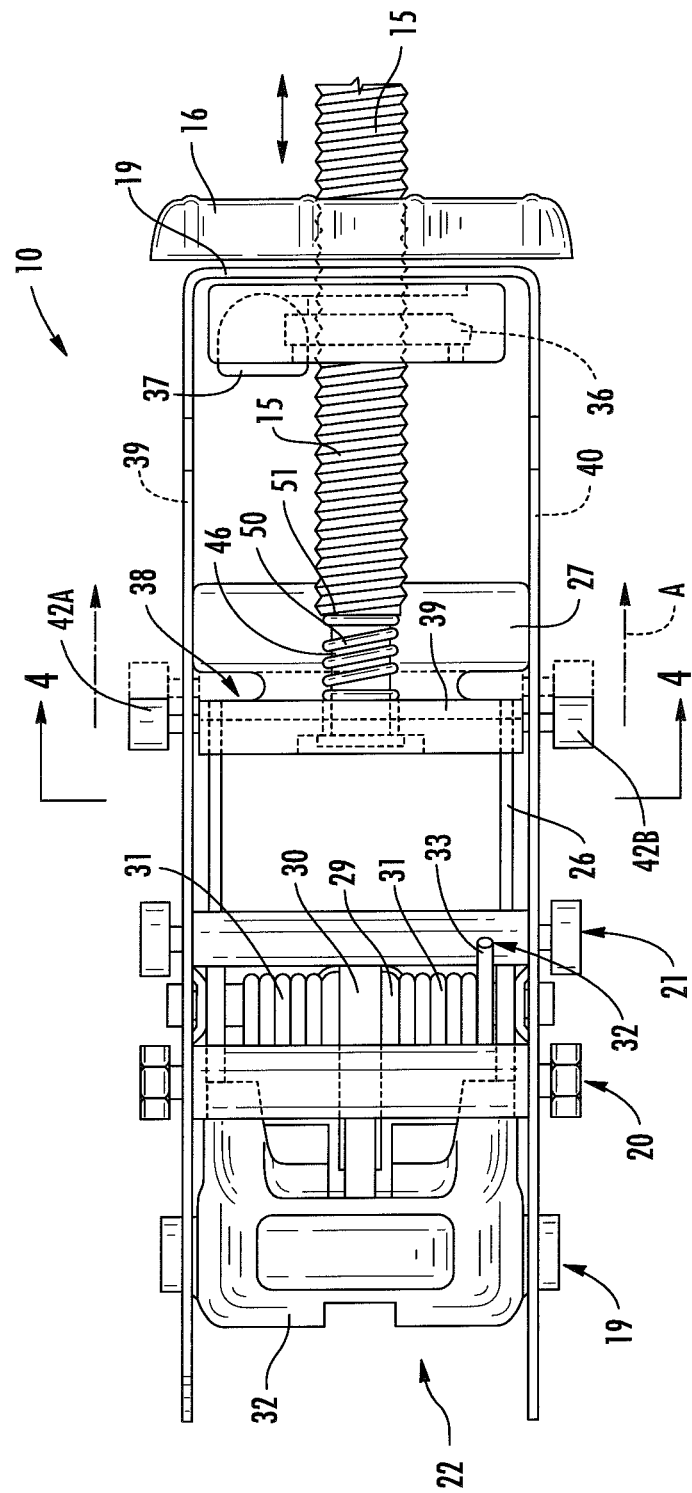
FIG. 2 is an enlarged partial top plan view illustrating the spring-urged tension rotational adjustment in engaged position and alternately in displaced position for imparted axle rotation as shown in broken lines.

The release portion 12 has an elongated U-shaped support frame 17 enclosing same with spaced parallel sidewalls 18A and 18B with an interconnecting integral end wall 19, best seen in FIG. 2 of the drawings. The sidewalls 18A and 18B are additionally interconnected by three primary cross support rod fittings 19, 20 and 21. The support fitting 19 functions as a bearing pivot rod for a common load chain engagement and release fitting 22 having a cast contoured body member 23 with a pair of engagement paws 24 extending therefrom in spaced parallel relation to one another.

Figure 3:
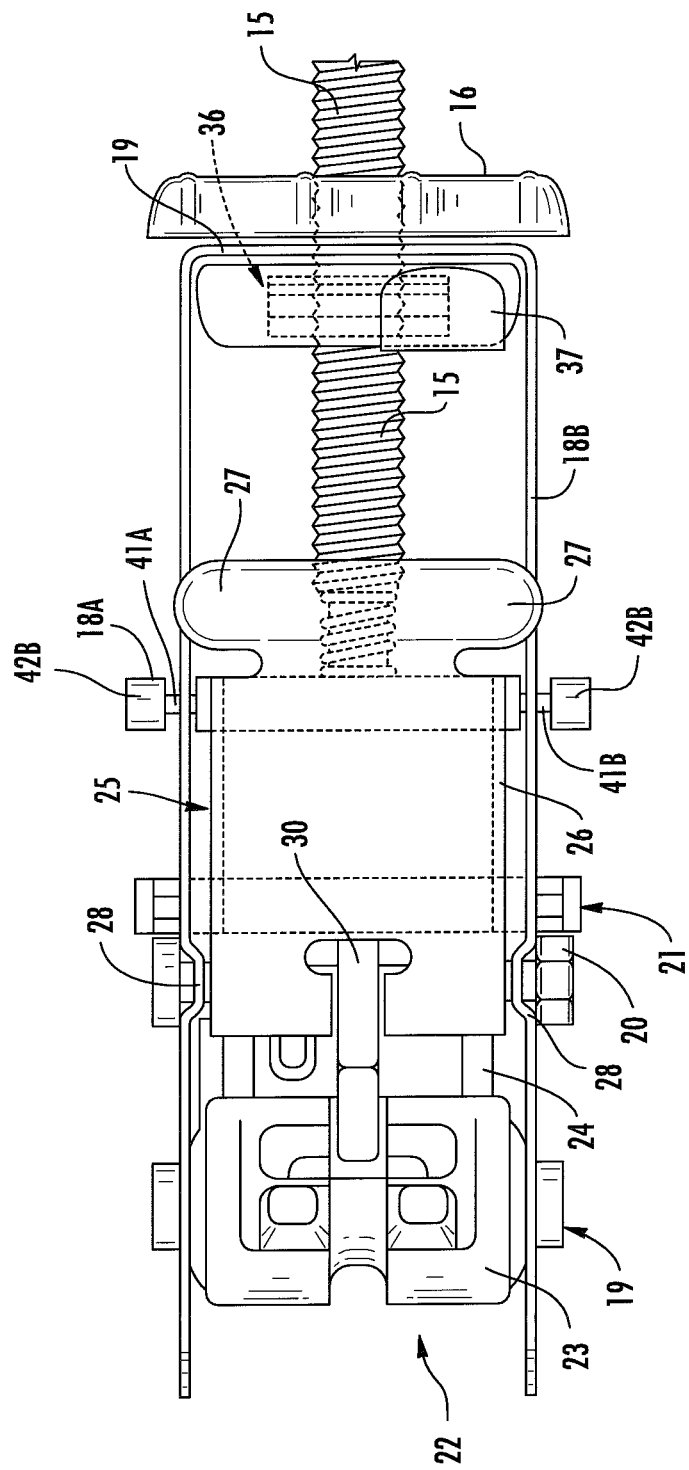
FIG. 3 is an enlarged partial bottom plan view thereof.

A chain release assembly 25, as seen in FIGS. 2 and 3 of the drawings, selectively engages with the chain engagement fitting 22 for retainment and release thereof when so engaged by a chain under load. The chain release assembly 25 has an activation release handle 26 with integrated spaced parallel apertured end tabs 27 extending therefrom and is pivotally secured to apertured aligned detents 28 in the respective sidewalls 18A and 18B by a support rod 29 extending therethrough as best seen in FIG. 2 of the drawings.

An index engagement release arm 30 extends from the central portion of the support rod 29 with a split spring assembly 31 positioned on the rod 29 on either side thereof providing resilient retainment thereto when the release handle 26 is so engaged with the chain engagement retainment and release fitting 22.

The cross support rod 21 extends in spaced parallel relation thereto and acts as a spring stop at 32 for the terminal end of the split coil spring 33.

It will therefore be seen that the spring urged release chain engagement fitting release assembly 25 maintains the chain engagement fitting 22 in locked position holding the chain, not shown, securely therewithin during use as will be understood by those skilled in the art. Upon lifting the release handle 26 as indicated in broken lines in FIG. 1 of the drawings, the interengagement with the chain engagement fitting 22 is achieved, releasing it from its locked safety position.

Referring now to FIGS. 1, 2 and 3 of the drawings, the hook release and tensioning device rotation assembly 10 of the invention can be seen. The hooks 13 integral threaded rod 15 extends, as noted, through an adjustment engagement fixture 35, best seen in FIGS. 3 and 4 of the drawings having the "fine" annular adjustment fitting 16 threadably disposed thereon with a selective thread rod engagement assembly 36 within the support frame 17 which allows selective rod rotational release for incremental "fine" longitudinal positioning adjustment by rotation of the annular adjustment fitting 16 to assure proper tensioning of the cargo load, not shown. A release and lock activation lever tab 37 can be seen in FIGS. 3 and 4 of the drawings to afford selective release allowing for rotatable adjustment as hereinbefore described.

The key improvement introduced by the nature of the invention is a rotational rod release assembly 38 which can be seen as having a rod rotation retainment bar 39 extending transversely between the respective sidewalls 18A and 18B, each of which has a correspondingly longitudinally extending guide bar receiving slots 40A and 40B therein, in spaced parallel aligned relation to one another.

The rod rotation retainment bar 39 has oppositely disposed slot support engagement rods 41A and 41B extending therefrom for registration through the respective slots 40A and 40B with corresponding enlarged finger engagement fittings 42A and 42B on their respective free ends beyond the outer surface of the sidewalls 18A and 18B for tactile engagement by the user, not shown, as will be described hereinafter indicated by direction engagement arrows A.

The rod rotational retainment bar 39 has a central bore at 43 extending transversely therethrough with an intersecting bar retainment channel 44 in a bar's surface 45 best seen in FIGS. 5 and 6. Correspondingly, the hereinbefore described threaded rod 15 has a non-threaded end portion 46 extending inwardly from its free end 47. A rotation fixation pin 48 extends through a pin receiving bore 49 transversely through the non-threaded end portion 46 of the rod 15 as shown in FIG. 6 of the drawings and in broken lines in FIG. 5 of the drawings. A spring 50 is positioned on the non-threaded rod end portion 46 so as to engage between the rod rotation retainment bar 39 and a threaded transition shoulder 51 formed on the rod 15 as will be understood within the art.

As assembled, the rotational rod release assembly 38 maintains a fixed orientation between the frame 16 and the hook 13. However, by engagement of the respective finger engagement fittings 42A and 42B the rod rotation retainment bar 39 can be moved against the resistance of the spring 50 so as freeing the rotation fixation pin 48 from the bar retainment channel 44 allowing the frame 16 to be rotated relative to the engaged position of the hook 13 orientation to assure that visual inspection of the cargo tensioning device 10 and its associated chain engagement fitting 22 has been achieved.

It will be evident from the above description that the effective "fine" longitudinal adjustment of retainment tension can still be achieved, as noted, by rotation of the annular adjustment fitting 16 without effecting the functional retainment of the rotational rod release assembly 38.

Therefore given the effective longitudinal placement under length associated requirements dependent on load configuration, the rod rotation retainment bar 39 within its respective guide slots 39 and 40 will accommodate operation within the full linear range adjustment possible to the threaded rod 15 and integral hook 13.

It will thus be seen that a new and novel adjustable cargo tensioning device for securing a load in an aircraft has been illustrated and described and that by utilization of the rotational rod release assembly 38, the effective orientation of the frame 16 and thus visual inspection of proper engagement and securing of the load retaining elements therewithin can be achieved.

It will be evident to those skilled in the art that various changes and modifications may be made therein without departing from the spirit of the invention, therefore I claim:

The invention claimed is:

1. An adjustable tie down tensioning device for securing cargo in an aircraft with cargo restraints to aircraft fixation fittings comprising in combination,
   a chain restraint release portion and a hook portion,
   said hook portion comprising a hook,
   a threaded adjustment rod extending from said hook in fixed relation thereto,
   a support frame threadably receiving said adjustment rod,
   a rotatable hook release for selectable rotation of said hook and said rod rotation orientation to said support frame when under cargo engagement tension,
   said rotatable hook release comprises,
   a rod rotation retainment bar slidably disposed within said support frame,
   said threaded adjustment rod slidably disposed through said rod rotation retainment bar,
   a retainment pin in said threaded adjustment rod for selective spring urged registration in said rotational retainment bar, securing said threaded adjustment rod from axle rotation therewithin.

2. The adjustable tie down tensioning device set forth in claim 1 wherein said hook has an access arm selectively defining access to said hook.

3. The adjustable tie down tensioning device set forth in claim 1 wherein said support frame is U-shaped having an end portion and spaced parallel extending sidewalls with said rod rotation retainment bar slidably received within and therebetween.

4. The adjustable tie down tensioning device set forth in claim 1 wherein said rod rotation retainment bar has a rod receiving bore transversely therethrough,
   a pin receiving channel in a surface of said rod retainment bar intersecting said rod receiving bore.

5. The adjustable tie down tensioning device set forth in claim 1 wherein said retainment pin in spring urged registration in said rod rotational retainment bar comprises,
   a coil spring on a non-threaded portion of said threaded adjustment rod extending inwardly from a free end thereof.

\* \* \* \* \*